United States Patent
Neemann et al.

(10) Patent No.: US 10,248,964 B1
(45) Date of Patent: Apr. 2, 2019

(54) SYSTEM AND METHOD FOR REWARDS REDEMPTION

(75) Inventors: Trey Neemann, Glendale, AZ (US); Lee H. Gowen, Lincoln, NE (US); Pavan K Pemmaraju, Phoenix, AZ (US); Claudia Asgeirsson, Rye, NY (US); Yuval Efrati, New York, NY (US); Mary O'Connell, Oradell, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 1010 days.

(21) Appl. No.: 12/847,832

(22) Filed: Jul. 30, 2010

(51) Int. Cl.
*G06Q 30/00* (2012.01)
*G06Q 30/02* (2012.01)

(52) U.S. Cl.
CPC ..... *G06Q 30/0233* (2013.01); *G06Q 30/0229* (2013.01)

(58) Field of Classification Search
CPC .............................. G06Q 10/00; G06Q 30/00
See application file for complete search history.

(56) References Cited

U.S. PATENT DOCUMENTS

| | | |
|---|---|---|
| 6,587,835 B1 | 7/2003 | Treyz et al. |
| 7,467,096 B2 | 12/2008 | Antonucci |
| 7,672,853 B2 * | 3/2010 | Gune ..................... G06Q 10/10 705/1.1 |
| 7,890,367 B2 | 2/2011 | Senghore et al. |
| 2002/0161630 A1 * | 10/2002 | Kern et al. ....................... 705/14 |
| 2002/0174011 A1 * | 11/2002 | Sanchez et al. ................ 705/14 |
| 2003/0040964 A1 * | 2/2003 | Lacek ..................... G06Q 30/02 705/14.14 |
| 2003/0171992 A1 | 9/2003 | Blagg et al. |
| 2006/0212355 A1 | 9/2006 | Teague et al. |
| 2008/0052226 A1 * | 2/2008 | Agarwal ............... G06F 17/277 705/39 |

OTHER PUBLICATIONS

Advisory Action dated May 23, 2013 in U.S. Appl. No. 12/850,345.
(Continued)

*Primary Examiner* — Naresh Vig
(74) *Attorney, Agent, or Firm* — Snell & Wilmer, L.L.P.

(57) ABSTRACT

A rewards management system is configured to facilitate the redemption of loyalty benefits at a financial institution and apply credits, payments, debits, and/or the like associated with the loyalty benefit to transactions that are characterized by a set of predetermined rules (e.g. an item purchased during a particular transaction, the merchant from whom the transaction originated, the vendor who manufactured the item). The system provides real-time management of the loyalty account so that the loyalty benefit can be used to offset the liability associated with a particular eligible transaction. The system may also be configured to allow a user to satisfy various obligations to the financial institution (e.g. a minimum payment associated with a statement from a transactions account). As such, the system allows the loyalty account provider or the financial institution to provide a customizable rewards program that allows loyalty benefits to be used for any type of transaction.

19 Claims, 3 Drawing Sheets

(56) References Cited

OTHER PUBLICATIONS

Final Office Action dated Mar. 1, 2013 in U.S. Appl. No. 12/850,345.
Final Office Action dated Mar. 17, 2015 in U.S. Appl. No. 12/850,345.
Department of Commerce, "2014 Interim Guidance on Patent Subject Matter Eligibility," Dec. 16, 2014, 59 pages, https://www.federalregister.gov/articles/2014/12/16/2014-29414/2014-interim-guidance-on-patent-subject-matter-eligibility#footnote-9.
Office Action dated Aug. 30, 2012 in U.S. Appl. No. 12/850,345.
Office Action dated Nov. 7, 2014 in U.S. Appl. No. 12/850,345.
Advisory Action dated Jun. 24, 2015 in U.S. Appl. No. 12/850,345.
Office Action dated Jan. 15, 2016 in U.S. Appl. No. 12/850,345.
Final Office Action dated Dec. 29, 2016 in U.S. Appl. No. 12/850,345.
USPTO; Non-Final Office Action dated Sep. 19, 2018 in U.S. Appl. No. 12/850,345.

* cited by examiner

US 10,248,964 B1

SYSTEM AND METHOD FOR REWARDS REDEMPTION

FIELD OF INVENTION

The present invention generally relates to the redemption of loyalty points, and more particularly, to a method and system for using loyalty points from a user's loyalty account by redeeming the loyalty points to a currency credit and posting the credit to a second account.

BACKGROUND OF THE INVENTION

Traditional loyalty (e.g., incentive award, frequency reward, etc.) programs have been around for years. Loyalty programs are typically used to help businesses develop and maintain participant loyalty and are used as marketing tools to develop new clientele. A frequent flyer program is an example of a typical loyalty program, where the more the participant uses a particular airline or group of affiliated airlines, the more frequent flyer miles the participant earns. After accumulating frequent flyer miles, the participant may choose to redeem those miles for upgrades in service or free airline tickets. Generally, these rewards programs have focused on providing discretionary and/or luxury benefits to consumers.

As competition in various markets increased, companies sought ways to expand loyalty programs to appeal to a broader cross-section of potential customers. One way this was accomplished was by developing strategic partnerships and affiliations with other business sectors. For example, hotel chains, airlines and rental car agencies developed loyalty program partnerships and affiliations, while transaction card companies also joined in to promote a more comprehensive and appealing loyalty program. While these strategies have been somewhat successful they still provide discretionary type benefits. Given the shift from discretionary to non-discretionary spending, there is a need to provide loyalty incentives that can be applied to everyday type purchases.

SUMMARY OF THE INVENTION

Systems and methods for managing a rewards account are provided. The rewards management system is configured to receive a request to redeem loyalty points for a monetary value. The monetary value can be applied to particular eligible transactions associated with a transaction account. In an embodiment, to determine whether a transaction is an eligible transaction, the system analyzes transaction data for a plurality of transactions associated with a transaction account. The system then identifies an eligible transaction from the plurality of transactions, wherein the eligible transaction is based on a set of predefined rules (e.g. the type of item purchased, the vendor who provides the item, the merchant from whom the item was purchased). The system then displays the eligible transactions via a user interface. The system is configured to receive a selection of an eligible transaction, such that a monetary credit can be directed to the eligible transaction. In response to the selection, the system debits the loyalty points from a loyalty account, credits the monetary value (associated with the loyalty points) to the eligible transaction and revises the transaction account statement with the reduced amount owed.

In an embodiment, the system may be configured to identify only transactions for which there are sufficient loyalty points and sufficient corresponding monetary value to satisfy the eligible transactions. The system may also be configured to credit transactions with monetary values that correspond to only a potion of the amount of the eligible transaction.

BRIEF DESCRIPTION OF THE DRAWINGS

A more complete understanding of the present inventions may be derived by referring to the detailed description and claims when considered in connection with the Figures, wherein like reference numbers refer to similar elements throughout the Figures, and:

DETAILED DESCRIPTION

Figure 1:
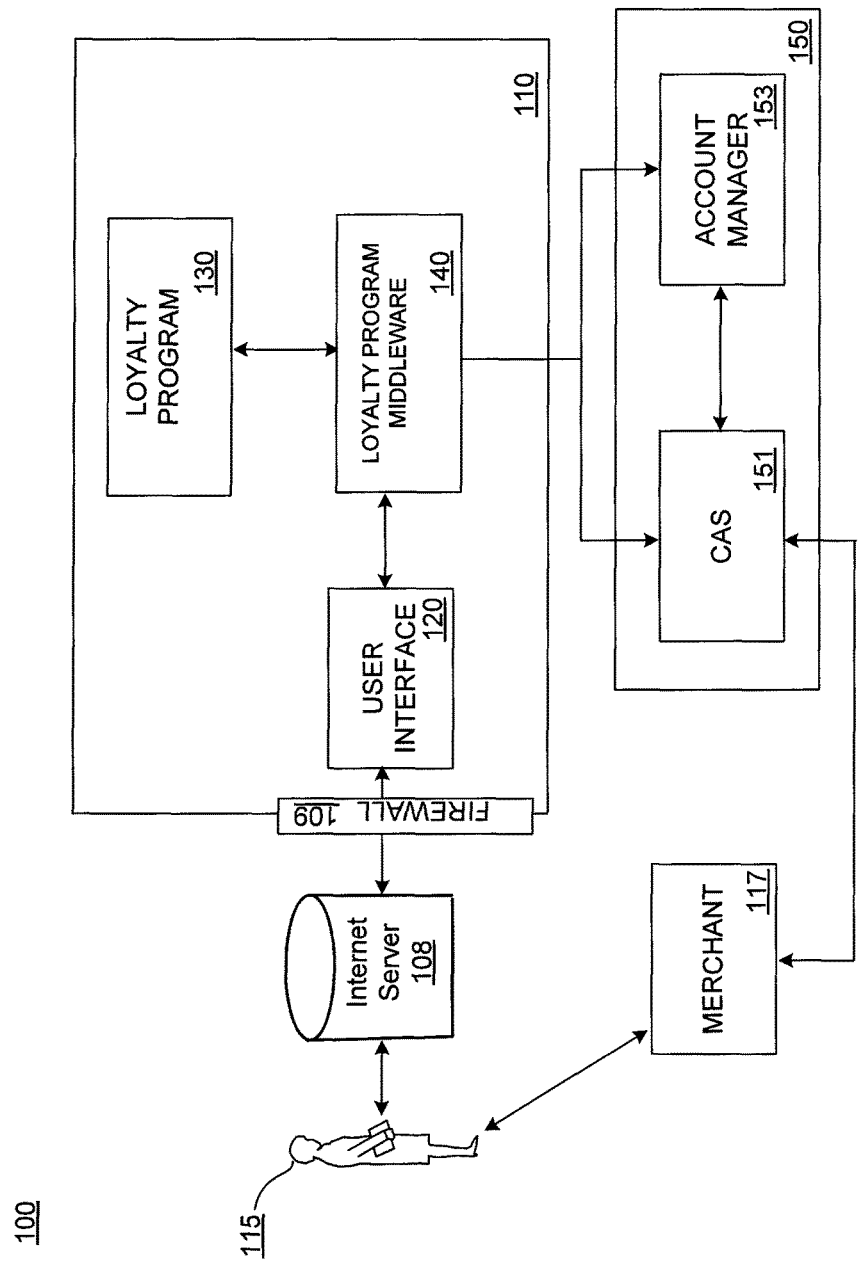
FIG. 1 is a block diagram illustrating major system components for managing a rewards account, in accordance with an exemplary embodiment.

The detailed description of exemplary embodiments herein shows exemplary embodiments by way of illustration and its best mode. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step.

For the sake of brevity, conventional data networking, application development and other functional aspects of the systems (and components of the individual operating components of the systems) may not be described in detail herein.

In general, the systems and methods include a unique combination of one or more features associated with the redemption and application of a benefit (e.g., loyalty points, awards, rewards, etc.) to transactions charged or otherwise applied against a transaction account. More specifically, a system and method is disclosed for identifying transactions from a group of transactions charged to a transaction account, where the identified transactions represent predefined types of purchases. The predefined types of purchases may be determined or grouped in any manner. For example, the predefined types of purchases may be categorized by the type of merchants where the purchase was made, the type of items being purchased, the cost of the items being purchased, the time of purchase, the place of purchase and/or any other suitable manner. For example, where the predefined type of purchases are associated with transactions for everyday purchases (e.g. groceries, fuel purchases, dry cleaning services purchases), the system identifies certain transactions associated with the everyday purchases, and allows the user to redeem points for a monetary credit that can be applied to the identified transactions.

Typically, transaction account issuer's have provided benefits to customers who use their transaction accounts. Often transaction account issuers enter into strategic relationships with merchants to provide incentives for using a particular transaction account with a particular merchant. For example, American Express and Delta Airlines have partnered to allow American Express Cardmembers to receive an additional benefit on top of the benefit the Cardmember receives by simply using the card with a merchant, who is not part of a strategic relationship. The strategic partner may provide the transaction account issuer with a fee for the strategic relationship. The strategic partner and the transaction account issuer may also work to develop a joint marketing plan to induce customer to use a particular transaction account with a particular strategic partner. In addition to traditional advertisements, the strategic partner and the transaction account issue may also provide benefits that induce the customer to conduct particular transactions in a particular manner. For example, the strategic partner may offer a discount to the customer where the customer makes a purchase of a particular good or service through a particular channel (e.g. the strategic partner's webpage). Similarly, the transaction account issuer may pay the strategic partner a fee or provide a discount on transaction fees in order to induce customers to patronize the strategic partner and use a particular transaction account. The strategic partner and/or transaction account issuer may have also developed related accounts, such as for example, loyalty accounts which were associated with the customer and accrued benefits based on patronage at a particular strategic partner with a particular transaction account.

In the past, the goods and services available for purchase with a loyalty account have generally been discretionary or luxury items, including for example, travel services, electronics, and the like. The goods and services available for purchase with a loyalty account may also have been goods and/or services that were provided by a strategic partner. However, in light of the current economic climate, it is advantageous to broaden the goods and services available to a customer. As such, and in accordance with an exemplary embodiment, a rewards management system may be configured to allow a customer to apply a rewards benefit to a particular transaction to offset a transaction amount or a portion of a transaction amount. The rewards management system may be configured to identify and allow points to be applied to particular transactions which fall within particular predefined categories, including for example, everyday items, non-discretionary items, non-partner items, and the like.

Suppliers of everyday items and/or non-discretionary items have generally not partnered with transaction account issuers to form strategic relationships. Typically, the profit margins on everyday items and/or non-discretionary items are lower than the profit margins on discretionary or luxury items. Profit margin is important in the context of the strategic relationship because there may be fees paid by the strategic partner in order to implement the strategic relationship (e.g., strategic partner pays a fee for each redeemed reward point). However, in light of current economic conditions, a transaction account issuer may be willing to create pseudo-strategic partners to induce a customer to use a particular transaction account to purchase everyday items and/or non-discretionary items. These pseudo-strategic partners may include regional partners (e.g. grocery stores) or business relevant partners (e.g. advertising services company), which would have previously not met the criteria to be a strategic partner. Thus, in accordance with an exemplary aspect, a transaction account issuer may provide the ability to redeem or use loyalty points to offset charges for on a transaction account for everyday items and/or non-discretionary items through its rewards management system. Everyday items may include for example, grocery and/or household items, fuel purchases, dry cleaning services, household utility services, and the like.

Moreover, the transaction account issuer would generally like to engage strategic partners with a national presence and strong brand recognition. However, retailers that provide everyday items may have a more limited market focus, in that they have a regional market presence rather than a national market presence. This presents a challenge to creating strategic relationships because it requires the transaction account issuer to seek out many strategic partners so that the transaction account issuer can serve and offer benefits to all of its customers across the various geographic regions the transaction account issuer serves. As such, and in accordance with an exemplary embodiment, the rewards management system may target specific types of transactions or transactions for specific types of products (e.g. transactions for grocery purchases) which are not associated with a specific retailer or group of retailers. Thus, the system allows transaction account issuers to overcome signing and retaining multiple partners by targeting specific types of purchases.

"User" may include any individual, customer, cardmember, employee, contractor, group, participant, beneficiary, account holder, account owner, recipient, charitable organization, software, hardware, and/or other entity that has an interest in a transaction account and/or a loyalty account award.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument (or card). The term "transaction instrument" is used herein to be synonymous with the term "transaction account," unless indicated otherwise.

A "transaction account code," "account," "account number" or "account code," as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

A "monetary value" or "credit value" as used herein, may include any statement credit, statement payment, statement debit, statement value, monetary credit, monetary transfer, credit monetary value, credit, discount, coupon, or similar benefit, provided to a user, directly or through a transaction account.

A "financial institution" may include any entity that offers transaction account services to recipients. Although often referred to as a "financial institution," the financial institution may represent any type of bank, brokerage, lender or other type of account issuing institution. It is further noted that other participants may be involved in some phases of the transaction, such as an intermediary settlement institution.

With reference to FIG. 1, and in accordance with an embodiment, system 100 may be any system configured to track, manage, analyze, identify, and/or store financial transactions associated with a transaction account, and track, manage, analyze, store, earn and/or redeem loyalty points. In an exemplary embodiment, system 100 comprises a Rewards Management System ("RMS") 110 in electronic communication with a financial institution 150 and/or a user 115. In an embodiment, RMS 110 may also be part of financial institution 150.

RMS may be in electronic communication with financial institution 150. The user interface may provide access to and electronic communication with the loyalty program, the loyalty program middleware, and/or various systems provided at financial institution 150 including a card authorization system ("CAS") and an account management system ("AMS"). An exemplary RMS 110 may be configured to monitor transactions resulting from a purchase conducted with a transaction account; analyze those transactions to determine to a predefined type of purchase; identify particular transactions based on a type of purchase being selected; facilitate the exchange of points to a monetary value; provide a monetary value credit to the transaction account; and/or reconcile the point balance of a loyalty account.

RMS 110 may be provided independently of financial institution 150. RMS 150 may be in communication with various components and/or systems of financial institution 150. RMS 110 may be in electronic communication with card authorization system ("CAS") 151 and/or account manager 153. CAS 151 may be any software or hardware-software system configured to facilitate transactions associated with a transaction account. For example, an exemplary CAS 151 receives an authorization request from a merchant to determine if the financial transaction account associated with a transaction card number is valid and has sufficient credit. CAS 151 includes systems for comparing the transaction details (e.g., account number, monetary amount of transaction, expiration date, etc) with the users financial transaction account information to determine if the financial transaction account is active and if a sufficient credit limit exists to complete a transaction. If these conditions are satisfied, CAS 151 returns to the merchant an approval code reflecting that the merchant is authorized to complete the transaction.

More particularly, with reference to FIG. 1, RMS 110 may comprise a user interface 120, a loyalty program 130, a loyalty program middleware 140, a card authorization system ("CAS") 151, account management system ("AMS") 153, and/or other systems. Other systems may include, for example, reporting engines, management information systems, business information systems, third-party data providers and the like. Each of the systems may be interconnected by a network via any method and/or device described herein.

User interface 120 comprises any hardware and/or software suitably configured to facilitate requesting, retrieving, updating, analyzing, entering and/or modifying data. In one embodiment, user interface 120 is configured to facilitate input, receipt and/or review of information relating to transactions initiated by user 115 at financial institution 150 and/or RMS 110. User interface 120 includes any device (e.g., personal computer) which communicates (in any manner discussed herein) with financial institution 150 and/or RMS 110 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that user interface 120 may or may not be in direct contact with RMS 110. For example, user interface 120 may access the services of RMS 110 through another server, which may have a direct or indirect connection to Internet server 108.

As those skilled in the art will appreciate, user interface 120 includes an operating system (e.g., Windows NT, 95/98/2000/XP/Vista/7, OS2, UNIX, Linux, Solaris, MacOS, etc.) as well as various conventional support software and drivers typically associated with computers. User interface 120 may include any suitable personal computer, network computer, workstation, minicomputer, mainframe or the like. User interface 120 can be in a home or business environment with access to a network. In an exemplary embodiment, access is through a network or the Internet through a commercially available web-browser software package.

User interface 120 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

User interface 120 may include any number of applications, code modules, cookies, and/or the like to facilitate interaction with RMS 110 and/or financial institution 150 in order to for example, view statements, view transactions terms, view transaction information, submit/authorize a transactions, and the like. In one embodiment, user interface 120 may store user 115 preferences and/or any other information disclosed herein on a hard drive or any other local memory device. Accordingly, user interface 120 may retrieve and store recipient information within a memory structure of user interface 120 in the form of a browser cookie, for example. In another embodiment, user interface 120 retrieves information relating to user 115 from RMS 110 and/or financial institution 150 on establishing a session with Internet server 108.

In an embodiment, account manager 153 is any software and/or hardware suitably configured to receive, store, and/or reconcile pending and posted transaction to a transaction account. For example, upon completion of a transaction (or a series of transactions), the merchant transmits a record of charges (ROC) and summary of charges (SOC) request to the account manager 153 requesting to be paid for the transaction. The ROC file generally contains transaction details which could include the merchant identification number, amount of purchase, date of purchase, and expiration date. The account manager 153 posts the ROC to the transaction account. At the end of a billing cycle, account manger 153 consolidates any pending posted ROCs to the account and issues a statement summarizing the ROCs and requesting payment. Typically, the statement contains a minimum obligation associated with the transaction account (e.g. a minimum payment) and a variety of other payment options. The statement may be provided as a physical paper statement, and electronic statement, or any other suitable form.

Firewall 109, as used herein, may comprise any hardware and/or software suitably configured to protect RMS 110 components from users of other networks. Firewall 109 may reside in varying configurations including stateful inspection, proxy based and packet filtering among others. Firewall 109 may be integrated as software within Internet server 108, any other RMS 110 components or may reside within another computing device or may take the form of a stand-alone hardware component.

Internet server 108 may include any hardware and/or software suitably configured to facilitate communications between user interface 120 and one or more RMS 110 components. Further, Internet server 108 may be configured to transmit data to user interface 120 within markup language documents. As used herein, "data" may include encompassing information such as commands, queries, files, data for storage, and/or the like in digital or any other form. Internet server 108 may operate as a single entity in a single geographic location or as separate computing components located together or in separate geographic locations.

Internet server 108 may provide a suitable web site or other Internet-based graphical user interface which is accessible by recipients. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

RMS 110 or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

Loyalty program middleware 140 may include any hardware and/or software suitably configured to facilitate communications and/or process transactions between disparate computing systems. Loyalty program middleware server and/or application 140 may serve as an intermediary between the various systems to ensure appropriate communications between disparate platforms. Middleware components are commercially available and known in the art. Loyalty program middleware 140 may be implemented through commercially available hardware and/or software, through custom hardware and/or software components, or through a combination thereof. Loyalty program middleware 140 may reside in a variety of configurations and may exist as a standalone system or may be a software component residing on the Internet server 108. Loyalty program middleware 140 may be configured to process transactions between the various components of RMS 110 and financial institution 150 and any number of internal or external systems 100 for the purposes disclosed herein.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, a computer and/or a computer program product. Accordingly, individual system 100 components may take the form of an entirely software embodiment, an entirely hardware embodiment, or an embodiment combining aspects of both software and hardware. In one embodiment, a system 100 component (e.g. a computer) may include a processor, a memory, a communications interface, a network interface, etc. Furthermore, individual system 100 components may take the form of a computer program product on a computer-readable storage medium having computer-readable program code means embodied in the storage medium. Any suitable computer-readable storage medium may be utilized, including hard disks, CD-ROM, flash memory, optical storage devices, magnetic storage devices, and/or the like. In one embodiment, a system 100 component and/or subsystem comprises a network interface communicating with a memory, the memory communicating with a processor; and the processor, when executing a computer program, configured to accomplish a variety of functions and/or steps.

The system discussed herein contemplates uses in association with web services, utility computing, pervasive and individualized computing, security and identity solutions, autonomic computing, commodity computing, mobility and wireless solutions, open source, biometrics, grid computing and/or mesh computing.

In one embodiment, and with continued reference to FIG. 1, RMS 110 may be configured as a reward point broker system. Rewards points may originate from any source and may be associated with RMS 110. RMS 110 may be configured to co-locate points in loyalty program 130. RMS 110 may also be configured to convert the points such that the points have a standard value. RMS 110 may also be configured with various conversion ratios such that points from various sources can be converted based on the value of the originated account. For example, providing a weighted conversion where points from a first account have a higher conversion value than points from a second account, but where points from both the first and second account can be combined in a common account such that each point in the common account has the same value. In other words, ten (10) Delta Airlines points may be converted to one (1) common account point and twenty (20) Hilton Hotel points may be converted to five (5) common account points, so the total points in the common account from these sources is six (6).

In an embodiment, RMS 110 may be configured to provide an incentive to a user to induce a particular transaction or behavior (e.g. pay transaction before a statement issues). RMS 110 may be configured to provide an award of loyalty points to an associated loyalty account where a user pays for an eligible transaction, before the statement date for the eligible transaction. Similarly, RMS 110 may be configured to provide an alternative higher point to monetary value conversion ratio where an eligible transaction is paid before a statement date. As such RMS 110 may provide a user with an incentive for prepayment, as described in U.S. patent application Ser. No. 10/750,030, entitled Method and Apparatus for Automatically Processing Invoiced Payments with Selectable Payment Terms, filed on Dec. 31, 2003, which is herein incorporated by reference in its entirety.

In an exemplary embodiment, loyalty program 130 may be any hardware and/or software suitably configured to analyze and apply predefined rules to transactions in response requests received by RMS 110. Loyalty program 130 may comprise various analysis engines, filters, and loyalty accounts.

In an embodiment, a plurality of loyalty accounts may be associated with loyalty program 130. Loyalty accounts may contain various types of loyalty benefits including for example, loyalty points, monetary credits, and other non-currency tender. Loyalty points include any type of non-currency tender, such as coupons, incentive awards, frequency awards, frequent flyer miles, points earned from the purchase of everyday items (e.g. Huggies® Enjoy the Ride Rewards), points earned from the purchase of discretionary items (e.g. My Starbucks rewards), and the like. In one embodiment, loyalty points may be the membership reward points awarded to participants in the American Express Membership Rewards® program.

Loyalty program 130 may be configured to analyze individual transactions posted to a transaction account associated with a loyalty program. Loyalty program 130 may analyze individual elements of transaction data, for example, the merchant from whom the transaction originated, the amount of the transaction, the type of item purchased in the transaction, the date of the transaction, and/or the like. The analysis allows loyalty program 130 to parse the various transactions posted to a transaction account and identify particular transactions that comply with a set of predefined rules. These predefined rules govern transactions to which loyalty benefits can be applied. In one embodiment, the application of the loyalty benefits occurs after the transaction has been authorized by the financial institution who issued the financial account. Moreover, the transaction is of an amount such that there is sufficient credit or value available from the transaction account to satisfy the purchase amount of the item, without considering any potential benefit associated an available reward.

Loyalty program 130 may comprise a series of predefined rules. The predefined rules may be used to analyze transactions to determine whether the transactions are eligible for a particular rewards program. The predefined rules may be created by a user, a financial transaction account issuer, a loyalty account provider, a merchant, a vendor and/or the like.

In various embodiments, the predefined rules may be based on any attribute contained in the transaction data, including for example, the type of merchant from whom the transaction originated, the amount of the transactions, the type of item being purchased, the transaction history of an eligible financial account and/or any other suitable criteria. In the past, rewards points have typically been used to purchase discretionary or luxury items. However, in an embodiment, any one of a user, a financial account issuer, or a loyalty account provider may recognize that there is a need to provide users with loyalty benefits to purchase non-discretionary or everyday items (e.g. groceries, vehicle fuel, dry cleaning services, and the like). As such, a user, a financial transaction account issuer, a loyalty account host, a third party and/or the like may create predefined rules that allow specific transactions to be sorted by an attribute(s) of the transaction data.

Transactions (which partially or fully meet the criteria of a predefined rule) may be identified by loyalty program 130. Loyalty program 130 may filter eligible transactions from a list of all transactions charged to the transaction account, and separately display the eligible transactions via user interface 120. Loyalty program 130 may also identify eligible transactions within a list of all transactions charged to the transaction account. For example, loyalty program may highlight, bold, italicize, or otherwise identify a particular transaction that conforms to one or more predefined rules.

In an embodiment, where a transaction is partially or fully ineligible, the loyalty program may filter the ineligible transaction so that it is not identified, it is not selectable by user 115, and/or it is not displayed to user 115 via user interface 120. Similarly, where a transaction is partially or fully eligible, but otherwise is subject to another action (e.g., the transaction has been identified as a possible fraudulent transaction, the transaction is in dispute, or is subject to another action), the transaction may not be identified by loyalty program 130 and/or selectable through user interface 120.

In an embodiment, user interface 120 may be provided via a social networking module, including for example, Facebook, Twitter, MySpace, an instant messaging program (e.g. Google Chat, iChat, etc), Linked In or any other suitable social networking module. User interface 120 may be configured to transfer points from a user's account associated with RMS 110. A user may create a link which contains a transfer of points through user interface 120. A user may also create a link which contains a transfer of a monetary value through user interface 120. Similarly, a user may create a link which contains a transfer of both points and a monetary value through user interface 120. The link can be communicated to a recipient via the social networking module. The recipient may select the link containing the transfer of points through the recipients user interface in the social networking module. Thereafter, the recipient's account may be automatically credited with the points, the monetary value or a combination of points and a monetary value, the recipient may accept the transfer of points, and/or the recipient may decline the transfer of points. As used herein, "creating a link" or similar phrase may include user creating the link, the user obtaining the link, the system creating the link for the user and/or the like. Moreover, any discussion of points or monetary value herein, may include all points, a subset of the points, different types of points, different values of points, a combination of points and monetary value and/or the like.

For example, where a user and a recipient both use Twitter and are associated with one another, the user in Italy (or anywhere in the world) may receive a twitter message from the recipient in the United States (or anywhere in the world) requesting a number of points to buy an airline ticket to Italy (or for any purpose). The user may access user interface 120 via the user's Twitter account, create a transfer link, and twitter (send) the link to the recipient. Thereafter, the recipient's account may be automatically credited, and the user may complete the airline ticket purchase. For additional details related to transferring points or money between accounts, see for example, U.S. patent application Ser. No. 12/355,527, filed on Jan. 16, 2009, and entitled "SYSTEMS AND METHODS FOR SETTLING AN ALLOCATION OF AN AMOUNT BETWEEN TRANSACTION ACCOUNTS" is hereby incorporated by reference.

In an embodiment, where a monetary value is discussed herein (e.g., transferred through a social networking module), the monetary value may be created with a charge which is applied to a transaction account associated with RMS 110, the monetary value may be created by converting points into a monetary value, or the monetary value may be created by charging a portion of the monetary value to a transaction account and converting a portion of the monetary value from points.

In an embodiment, the predefined rules for determining an eligible transaction may include that any monetary value transfer which originates from a social networking site and results in a charge to an associated transaction account is an eligible transaction. Similarly, the user creating the monetary transfer at the social networking site may be requested to provide details regarding the transaction (e.g. purpose of the transfer, the recipient, and the intended purchase), such that the resulting charge to the transaction account can be analyzed by loyalty program 130 to determine whether the charge meets a certain portion of the predefined rules to such that it is an eligible transaction.

In an embodiment, loyalty program 130 may also be configured to analyze the particular attributes of an eligible transaction in view of the loyalty benefits user 115 has available. Loyalty program 130 may evaluate a balance of loyalty points in a loyalty account and determine a corresponding monetary value. This determination of monetary value may be based on various rules governing the loyalty account, the party receiving the monetary credit, the party providing the monetary credit, the terms governing the transaction account, the prior behavior of the user, the level of membership associated with the loyalty account or the transaction account, and/or various other rules. Based on the monetary value determined, loyalty program 130 may identify various eligible transactions based on the monetary value of the loyalty points and the transaction amount of one or more transactions.

In an embodiment, where various transactions are eligible transactions under the predefined rules, each transaction may be further analyzed by loyalty program 130 based on the monetary value available from one or more loyalty accounts. Loyalty program 130 may identify one of more eligible transactions that may be satisfied by the monetary value associated with the loyalty accounts. Where a transaction is an eligible transaction, but the monetary value of the loyalty points are not sufficient to satisfy the entire amount of the transaction, loyalty program 130 may not identify that eligible transaction as one that may be paid with loyalty points. Loyalty program 130 may also provide user 115 with the opportunity to pay a partial amount of an eligible transaction, where the monetary value from the loyalty account is not sufficient to satisfy the entire transaction amount.

In an embodiment, loyalty program 130 may only analyze transactions that have been processed by account manager 153 and provided to user 115 as part of a statement for a transaction account. Loyalty program 130 may analyze transactions that have been authorized by CAS 151 but that have not been billed to user 115 as part of a statement and transactions that have be been billed to user 115 as part of a statement.

Loyalty program 130 may be configured to authorize a payment with loyalty points that can be directed to an eligible transaction. For example, where a transaction that has been billed to user 115 as part of a statement is identified as an eligible transaction, loyalty program 130 may allow a user to make a payment directed at the eligible transaction. This payment may also satisfy the payment obligation (e.g. a minimum payment) of user 115 that is provided in the statement.

In an embodiment, loyalty program 130 may be configured to transmit a credit to the transactions account, which is directed to an eligible transaction. Where a credit is provided to the transaction account, there may be no impact of the payment obligation of user 115 for a statement that may be otherwise credited by the credit. Put another way, loyalty program 130 provides a credit that is not considered a payment to the transaction account. Thus, user 115 is still obligated to satisfy a payment obligation (e.g. minimum payment) associated with statement from the transaction account.

In an embodiment, loyalty program 130 may be configured to authorize a partial payment of a minimum payment, wherein at least a portion of the minimum payment is associated with one or more eligible transactions. For example, where a minimum payment of $300 is required and the total minimum payment is associated with one or more eligible transactions, but the balance of the loyalty account has a sufficient points balance to pay $100 dollars, loyalty program 130 may be configured to allow the payment of $100. As such, the minimum payment is reduced to $200. Thereafter, the remaining balance of the minimum payment may be satisfied with other funding sources.

In an embodiment, loyalty program 130 may be configured with a recurring redemption feature. Loyalty program 130 may be configured to transfer, apply, redeem, or otherwise use points in response to a trigger event. A trigger event may be any date, time, predetermined balance of rewards points, predetermined balance of posted transactions, an authorization request, and/or the like. The trigger event may be defined by a user. For example, a user may define a rule at loyalty program 130 which requires that 5,000 loyalty points are redeemed against eligible transactions of a statement balance, each time the loyalty account balance reaches 10,000 loyalty points.

As discussed above, the monetary value may be a coupon, voucher, credit, or any other suitable mechanism that provides an adjustment (e.g., discount) for any item (e.g., associated with a purchase). For example, where the user purchases an item for a purchase price of $50.00, the user may elect to apply a monetary value (e.g., coupon) of $1.00. The monetary value may be applied at the point of sale to reduce the purchase price to $49.00 or otherwise reduce the amount charged for the item by the amount of the monetary value. The monetary value may be applied, such that the authorization and associated charge to an associated transaction account is reduced by the amount of the monetary value.

In an embodiment, loyalty program 130 may be configured to create a monetary value in response to a user request. The monetary value may be created at loyalty program 130 prior to a purchase by redeeming reward points, and such monetary value may be stored at loyalty program 130 for future use.

In an embodiment, the monetary value may be provided to the user as an incentive in response to a trigger event (e.g. achieving a particular spend level) or to induce a particular behavior (e.g. enrollment in a loyalty program).

Where the monetary value is created or provided to a user for future use, the monetary value may be stored, such that it is accessible to the user in any manner. For example, the user may accumulate various monetary values related to various items (e.g. a discount for a particular product or service) or classes of items (e.g. a discount for a class of products or services). The monetary values may then be stored and accessed by the user. The monetary value may be accessed based on a classification (e.g. a coupon for a particular class of products or services). The monetary value may also be stored and accessed by the user based on an attribute of the monetary value (e.g. an expiration date, an amount, location where the monetary value may be redeemed) or by any other suitable attribute or classification.

In another embodiment, the monetary value may be created at loyalty program 130 at the time of a purchase. Loyalty program 130 may be configured to create a monetary value based on a product to be purchased, a merchant where the transaction originates, a location where the transaction originates, and/or the like.

The monetary value may also be applied at the time of purchase. For example, the user may elect to apply the monetary value to reduce the purchase price of an item. Where the monetary value is applied, the reduced purchase price may be authorized and/or charged to a transaction account.

In an embodiment, an expiration or duration may be assigned to the monetary value. The expiration or duration may be a date set by a merchant, a user, an account issuer, a product supplier, a service supplier, and/or the like. The expiration or duration may also be a date which is determined based on activity associated with a particular transaction account, activity associated with a particular loyalty account, a region where the monetary value will be used, and/or the like.

Figure 2:
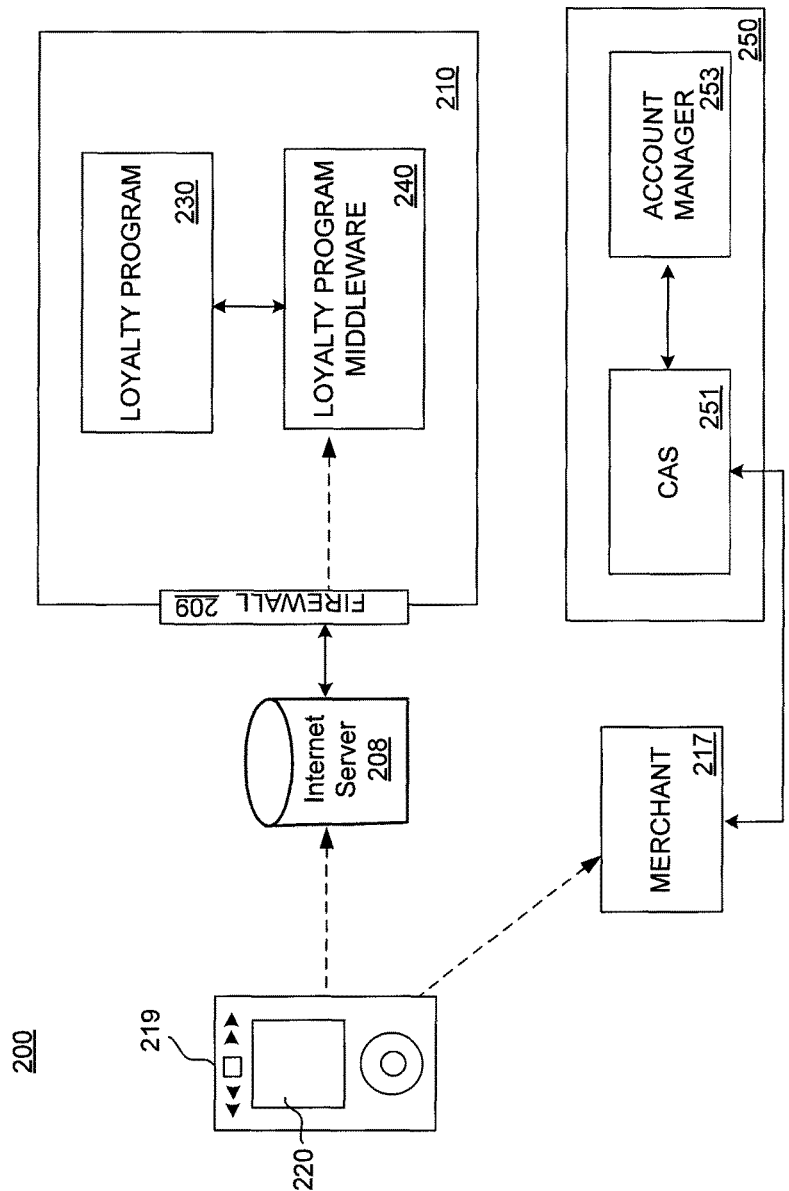
FIG. 2 is a block diagram illustrating major system components in a mobile environment for managing a rewards account, in accordance with an exemplary embodiment.

In an embodiment, and with reference to FIG. 2, RMS 210 may be at least partially configured within a mobile device 219. Mobile device 219 may be any mobile device which is at least intermittently connectable to a network and configured to run a customizable micro-application (hereinafter "micro-app"). Mobile device 219 may be a smart-phone, including for example a mobile telephone configured with a Palm mobile operating system, a Windows mobile operating system, an Android Operating System, Apple iOS, a Blackberry operating system and the like, a tablet PC, including for example an iPad, a portable electronic device, including for example a PDA, an iPod Touch, and the like, or any other suitable mobile device.

In an embodiment, mobile device 219 may be configured with a user interface 220. User interface 220 may take the form of a micro-app or any other suitable interface. User interface 220 may be configured to display various attributes of a customer account which reside within RMS 210. The attributes may include for example, a point balance, a list of recent transactions, a list of eligible transactions, and the like. User interface 220 may also be configured to conduct various activities, including for example, sorting transactions, paying with points, transferring points, applying a credit to a transaction, and/or the like.

In an embodiment, mobile device 219 may be configured to complete transactions with merchant 217 at a point of sale terminal. Mobile device 219 may be configured to communicate with a point of sale terminal via any suitable communications protocol. Mobile device 219 may automatically connect to a point of sale terminal. Mobile device 219 may also connect once a connection is authorized by a user through user interface 220, or another suitable connectivity module.

In various embodiments, the user may complete transactions with a network connection present, or where no network connection is present, based on various authorization rules. In one embodiment, mobile device 219 is connected to a network and a point of sale terminal. Mobile device 219 may be configured to provide account information to the point of sale terminal. This account information may enable the point of sale device to communicate with an account issuer. The account issuer may administer the transaction account and the loyalty account. The loyalty account may be administered by a third party that is in contact with the account issuer. In response to the point of sale terminal receiving the account information, the point of sale terminal may provide transaction information to the account issuer (e.g. the product and/or service identifier for each item being purchased and the transaction amount for each item being purchased). The transaction account issuer may initiate an authorization process where each product and/or service identifier is evaluated to determine whether the product in an eligible transaction. As used herein, an eligible transaction may be any transaction associated with a payment initiated by a mobile device. In response to eligible transactions being identified, the transaction account issuer may determine a point value associated with the transaction amount for each eligible transaction. This point value may be compared to the point balance of the loyalty account, to determine which transactions may be purchased with points. The transaction account issuer may then communicate the eligible transactions which may be purchased with points to mobile device 219. The user may then select which eligible transactions to pay with points. The selected transaction may be communicated to the transaction account issuer and/or the point of sale terminal (e.g. as an authorization for the selected transaction). The transaction account issuer may also provide an authorization for the selected transactions, where the mobile device does not provide the selected transaction to the point of sale terminal.

In an embodiment, user interface 220 may be configured to sync with RMS 210 each time a network connection is present. Moreover, user interface 220 may be configured to complete a predetermined number of transactions before user interface 220 syncs with RMS 210 again. For example, where mobile device 219 is in airplane mode and there is no network connection present, the user may complete a transaction via user interface 220 providing that the transaction meets the authorization rules within user interface 220 (e.g. the loyalty account has a sufficient balance of points to complete the transaction as of the last sync with RMS 210).

In an embodiment, mobile device 219 is not connected to a network, but is connected to a point of sale terminal. Mobile device 219 may be configured to provide account information to the point of sale terminal. This account information may be associated with various accounts including at least one transaction account and one loyalty account. In response to the point of sale terminal receiving the account information, the terminal may provide transaction information to mobile device 219 (e.g. the product and/or service identifier for each item being purchased and the transaction amount for each item being purchased). The mobile device may then initiate an authorization process, where each product and/or service identifier is evaluated to determine whether the product in an eligible transaction. Once eligible transactions are identified, the mobile device may determine a point value associated with the transaction amount for each eligible transaction. This point value may be compared to the point balance of the loyalty account, to determine which transactions may be purchased with points. The mobile device may then display a list of eligible transaction to a user. The user may select which eligible transactions to pay with points. The selected transaction may be communicated to the point of sale terminal (e.g. as an authorization for the selected transaction) and to the transaction account issuer when the mobile device is able to sync again.

In an embodiment, user interface 220 and RMS 210 may be associated with various transaction accounts. RMS 210 may be configured to authorize a transaction where the transaction meets the criteria for an eligible transaction, but there are not sufficient rewards points to satisfy the total amount associated with the transaction. Where there are not sufficient points, RMS 210 may be configured to authorize a payment comprising rewards points and a monetary value from one or more of the associated transaction accounts.

In an embodiment, a user may be able to create a monetary value at the time of purchase to offset the purchase price of an item. For example, when the user buys an item using mobile device 219, but does not have a sufficient balance of points to purchase the item using only points, RMS 210 may be configured to create a monetary value (e.g. a coupon, voucher, credit, and/or the like) to reduce the purchase amount at the point of sale. Where RMS 210 and/or mobile device 219 determines that there are not sufficient points to satisfy the transaction, the user may be presented with an option to create a monetary value at user interface 220. The coupon may be redeemed at the point of sale device to reduce the purchase price of the item. This would allow the user to apply loyalty points, before the purchase price of the item is posted as a charge to a transaction account.

As discussed above, a user may posses multiple monetary values. In an embodiment, the monetary values may be accessible by mobile device 219. The monetary values may be accessible based on the transaction data associated with the purchase. For example, where the user makes a purchase with mobile device 219, the mobile device may search stored monetary values at RMS 210 or at user interface 220 and identify monetary values that are related to the purchase. Similarly, the user may be able be able to select a type of monetary value (e.g. a coupon for a class of items) through user interface 220 and apply a previously acquired monetary value to the purchase to reduce the purchase price of the item.

In an embodiment, mobile device 219 may be configured to satisfy transactions that have posted to a transaction account with points. In particular, a user may access loyalty program 230 through user interface 220. The user interface may be configured to filter transactions as eligible and ineligible transactions. The filter may occur automatically or in response to a user input. Thereafter, the user may select a particular eligible transaction and apply points from the loyalty account to all or a portion of the transaction amount.

Figure 3:
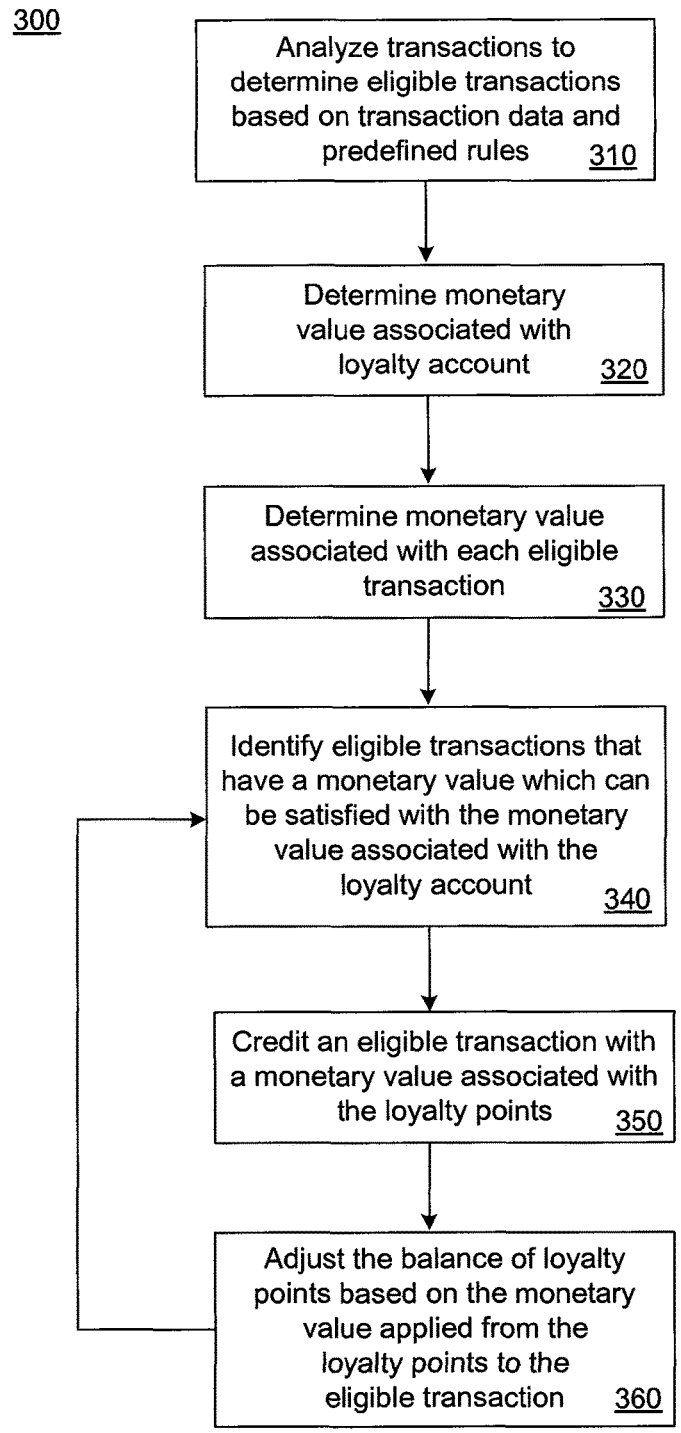
FIG. 3 is a flow chart illustrating an exemplary process for managing a rewards account, in accordance with an exemplary embodiment.

With reference to FIG. 3, in an embodiment, loyalty program 130 analyzes transactions associated with a transaction account to determine which transactions are partially or fully eligible transactions based on transaction data and predefined rules (Step 310). Loyalty program 130 then determines the monetary value associated with a loyalty account (Step 320). Loyalty program 130 also determines the monetary value associated with each eligible transaction (Step 330). Based on the monetary value associated with the loyalty account and the monetary value associated with each eligible transaction, loyalty program 130 identifies eligible transactions that have a monetary value which can be satisfied with the monetary value associated with the loyalty account (Step 340). In response to a request from user 115, loyalty program 130 provides a credit to an eligible transaction with a monetary value associate with the loyalty points (Step 350). Once the credit is processed, loyalty program 130 adjusts the balance of loyalty points based on the monetary value applied from the loyalty account to the eligible transaction (Step 360). Once the loyalty account has been adjusted, the loyalty program 130 may identify eligible transactions that have a monetary value which can be satisfied with the monetary value associated with the loyalty account (Step 340), and repeat the process until there are no eligible transaction that can be satisfied by the loyalty account, or until user 115 terminates her request to provide credits to eligible transactions with a loyalty account.

A rewards management system for use in a telecommunications network may also interface with the embodiments herein. In particular, such a system includes a mobile communication device configured to communicate over a wireless telecommunication network, a telecommunication service provider configured to facilitate a connection to the wireless telecommunication network, a rewards management system, a financial institution, and a communication network providing communication between the telecommunication service provider, the rewards management system, and the financial institution. The rewards management system includes a loyalty program configured to track activities which generate loyalty benefits, store the loyalty benefits, and determine a monetary value associated with the loyalty benefits and a loyalty program middleware which facilitates communication of the loyalty program with a financial institution such that the loyalty benefit can be used to satisfy obligations associated with a transaction account issued by the financial institution on the connection.

A rewards management system for a peer-to-peer transaction may also interface with the embodiments herein. In particular, such a system includes first and second personal communication devices configured to participate in a peer-to-peer transaction, a rewards management system, and a communication network providing two-way communication between one of said personal communication devices and the rewards management system. The rewards management system includes a loyalty program configured to track activities which generate loyalty benefits, store the loyalty benefits, and determine a monetary value associated with the loyalty benefits and a loyalty program middleware which facilitates communication of the loyalty program with a financial institution such that the loyalty benefit can be used to satisfy obligations associated with a transaction account issued by the financial institution.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

In order to control access to any component of RMS 110, Internet server 108 may invoke an authentication server (not shown) in response to user 115 submissions of authentication credentials received at Internet server 108 from user interface 120. The authentication server may include any hardware and/or software suitably configured to receive authentication credentials, encrypt and decrypt credentials, authenticate credentials, and grant access rights according to privileges (e.g., pre-defined privileges) attached to the credentials. The authentication server may grant varying degrees of application and data level access to users based on information stored within a database and/or any other known memory structure.

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Totty, HTTP, The Definitive Guide (2002), the contents of which are hereby incorporated by reference.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, or C' or 'at least one of A, B, and C' are used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A method comprising:

transmitting, by a computer based system and to a social network via a social networking module, transaction account information to initiate transactions at different merchant systems within the social network, the social networking module communicating with a rewards management system;

receiving, by the computer based system and from a payment processor system, authorizations for the transactions that result in records of charges (ROCs);

receiving, by the computer based system and from the payment processor system, ROCs having transaction information containing transaction amounts and item identifiers, the ROCs being received from the different merchant systems, including, by the computer based system, the ROCs in an online billing statement;

removing, by the computer based system, the ROCs that are in dispute to create a first subset of ROCs;

determining, by the computer based system, the item identifiers of the first subset of ROCs that meet an eligible transaction criteria for an eligible transaction to create a second subset of ROCs;

identifying, by the computer based system and on the online billing statement, the second subset of ROCs with the item identifiers that meet the eligible transaction criteria;

converting, by the computer based system, each ROC in the second subset of ROCs into a selectable item in the online billing statement;

displaying, by the computer based system, the second subset of ROCs as selectable items in the online billing statement;

receiving, by the computer based system, a selection of the selectable item on the online billing statement indicating that at least a portion of the transaction amounts for the second subset of ROCs are paid with loyalty points to create the online billing statement with selected ROCs and non-selected ROCs, in response to the selection;

determining, by the computer based system, an eligible transaction amount that is a portion of a transaction amount that corresponds to the item identifiers of the selected ROCs that meet the eligible transaction criteria;

determining, by the computer based system, a loyalty account balance from different sources of loyalty points, converting, by the computer based system, the different sources of loyalty points using a conversion ratio to create a standard value of the loyalty points;

determining, by the computer based system, a number of loyalty points needed to correspond to the eligible transaction amount based on the standard value;

displaying, by the computer based system and on the online billing statement, the number of loyalty points adjacent to the eligible transaction amount;

creating, by the computer based system and via a micro-application for the social network, a link to request loyalty points from a second user, in response to a request from a first user for the link;

requesting, by the computer based system and from a first user, details about a transaction, the details about the transaction including purpose of a transfer of the loyalty points, a recipient, and an intended purchase with the loyalty points;

transferring, by the computer based system and via the social network, the link and the details to the second user, receiving, by the computer based system and from the second user, a selection of the link indicating an authorization for a transfer of an additional number of loyalty points to a first loyalty account;

transferring, by the computer based system, the additional number of loyalty points from a second loyalty account associated with the second user and depositing the additional number of loyalty points into the first loyalty account, in response to the authorization and in response to the loyalty account balance being less than the number of loyalty points corresponding to the eligible transaction amount by the additional number of loyalty points;

receiving, by the computer based system and in response to the transferring, an indication of a deposit of the additional number of loyalty points into the first loyalty account;

applying, by the computer based system, the additional number of loyalty points to the eligible transaction amount in the online billing statement;

removing, by the computer based system, a payment obligation for the selected ROCs; and reducing, by the computer based system, a total amount owed for the online billing statement by the eligible transaction amount.

2. The method of claim 1, wherein the applying satisfies the payment obligation associated with a transaction account.

3. The method of claim 1, wherein the eligible transaction criteria is established by at least one of a user, a transaction account issuer, a loyalty account issuer, a merchant, or a vendor.

4. The method of claim 1, wherein the eligible transaction criteria identifies the transaction associated with an everyday purchase as the eligible transaction.

5. The method of claim 4, wherein the everyday purchase is associated with at least one of a transaction for groceries, a transaction for vehicle fuel, or a transaction for dry cleaning services.

6. The method of claim 1, wherein the applying occurs on a recurring basis during a set period of time with a predetermined number of loyalty points.

7. The method of claim 1, wherein the eligible transaction is selectable and an ineligible transaction is not selectable.

8. The method of claim 1, further comprising,
reconciling, by the computer based system, the loyalty account balance in response to the applying;
determining, by the computer based system, a second monetary value associated with the loyalty account balance; and
identifying, by the computer based system, a second selection of the eligible transaction from the transactions.

9. The method of claim 8, further comprising,
receiving, by the computer based system, a second selection of the second selection of the eligible transaction, wherein the second eligible transaction is based on the eligible transaction criteria and the second monetary value being sufficient to satisfy the second selection of the eligible transaction;
debiting, by the computer based system, the loyalty points from a loyalty account; and crediting, by the computer based system, the second monetary value to the second selection of the eligible transaction.

10. The method of claim 9, further comprising displaying, by the computer based system, only a first selection of the eligible transaction and the second selection of the eligible transaction.

11. The method of claim 1, wherein the conversion ratio is increased in response to paying for the eligible transaction before a due date.

12. The method of claim 1, wherein the ROCs are not selectable in response to a monetary value being insufficient to satisfy the transaction.

13. The method of claim 1, wherein the ROCs are posted to a statement associated with a transaction account.

14. The method of claim 1, further comprising using the loyalty points to satisfy a minimum payment requirement for a transaction account.

15. The method of claim 1, wherein a minimum monetary payment amount is still due, regardless of the paying at least a portion of the transaction amounts for the ROCs with the loyalty points.

16. The method of claim 1, wherein the eligible transaction criteria are used to analyze the transactions based on at least one of an item type, the different merchant systems from whom the transaction originated, or a vendor of the item.

17. The method of claim 1, further comprising transmitting, by the computer based system, a request to an account issuer to create the transfer of a second monetary value.

18. A non-transitory, tangible computer-readable storage medium having computer-executable instructions stored thereon that, if executed by a computer based system, cause the computer based system to perform a method comprising:
transmitting, by the computer based system and to a social network via a social networking module, transaction account information to initiate transactions at different merchant systems within the social network, the social networking module communicating with a rewards management system;
receiving, by the computer based system and from a payment processor system, authorizations for the transactions that result in records of charges (ROCs);
receiving, by the computer based system and from the payment processor system, ROCs having transaction information containing transaction amounts and item identifiers, the ROCs being received from the different merchant systems,
including, by the computer based system, the ROCs in an online billing statement;
removing, by the computer based system, the ROCs that are in dispute to create a first subset of ROCs;
determining, by the computer based system, the item identifiers of the first subset of ROCs that meet an eligible transaction criteria for an eligible transaction to create a second subset of ROCs;
identifying, by the computer based system and on the online billing statement, the second subset of ROCs with the item identifiers that meet the eligible transaction criteria;
converting, by the computer based system, each ROC in the second subset of ROCs into a selectable item in the online billing statement;
displaying, by the computer based system, the second subset of ROCs as selectable items in the online billing statement;

receiving, by the computer based system, a selection of the selectable item on the online billing statement indicating that at least a portion of the transaction amounts for the second subset of ROCs are paid with loyalty points to create the online billing statement with selected ROCs and non-selected ROCs, in response to the selection;

determining, by the computer based system, an eligible transaction amount that is a portion of a transaction amount that corresponds to the item identifiers of the selected ROCs that meet the eligible transaction criteria;

determining, by the computer based system, a loyalty account balance from different sources of loyalty points, converting, by the computer based system, the different sources of loyalty points using a conversion ratio to create a standard value of the loyalty points;

determining, by the computer based system, a number of loyalty points needed to correspond to the eligible transaction amount based on the standard value;

displaying, by the computer based system and on the online billing statement, the number of loyalty points adjacent to the eligible transaction amount;

creating, by the computer based system and via a micro-application for the social network, a link to request loyalty points from a second user, in response to a request from a first user for the link;

requesting, by the computer based system and from a first user, details about a transaction,
the details about the transaction including purpose of a transfer of the loyalty points, a recipient, and an intended purchase with the loyalty points;

transferring, by the computer based system and via the social network, the link and the details to the second user, receiving, by the computer based system and from the second user, a selection of the link indicating an authorization for a transfer of an additional number of loyalty points to a first loyalty account;

transferring, by the computer based system, the additional number of loyalty points from a second loyalty account associated with the second user and depositing the additional number of loyalty points into the first loyalty account, in response to the authorization and in response to the loyalty account balance being less than the number of loyalty points corresponding to the eligible transaction amount by the additional number of loyalty points;

receiving, by the computer based system and in response to the transferring, an indication of a deposit of the additional number of loyalty points into the first loyalty account;

applying, by the computer based system, the additional number of loyalty points to the eligible transaction amount in the online billing statement;

removing, by the computer based system, a payment obligation for the selected ROCs; and reducing, by the computer based system, a total amount owed for the online billing statement by the eligible transaction amount.

19. A computer based system comprising:

a network interface communicating with a memory; and
the memory communicating with a processor, the processor, when executing a computer program, is configured to perform operations comprising:

transmitting, by the processor and to a social network via a social networking module, transaction account information to initiate transactions at different merchant systems within the social network, the social networking module communicating with a rewards management system;

receiving, by the processor and from a payment processor system, authorizations for the transactions that result in records of charges (ROCs);

receiving, by the processor and from the payment processor system, ROCs having transaction information containing transaction amounts and item identifiers, the ROCs being received from the different merchant systems, including, by the processor, the ROCs in an online billing statement;

removing, by the processor, the ROCs that are in dispute to create a first subset of ROCs;

determining, by the processor, the item identifiers of the first subset of ROCs that meet an eligible transaction criteria for an eligible transaction to create a second subset of ROCs;

identifying, by the processor and on the online billing statement, the second subset of ROCs with the item identifiers that meet the eligible transaction criteria;

converting, by the processor, each ROC in the second subset of ROCs into a selectable item in the online billing statement;

displaying, by the processor, the second subset of ROCs as selectable items in the online billing statement;

receiving, by the processor, a selection of the selectable item on the online billing statement indicating that at least a portion of the transaction amounts for the second subset of ROCs are paid with loyalty points to create the online billing statement with selected ROCs and non-selected ROCs, in response to the selection;

determining, by the processor, an eligible transaction amount that is a portion of a transaction amount that corresponds to the item identifiers of the selected ROCs that meet the eligible transaction criteria;

determining, by the processor, a loyalty account balance from different sources of loyalty points, converting, by the processor, the different sources of loyalty points using a conversion ratio to create a standard value of the loyalty points;

determining, by the processor, a number of loyalty points needed to correspond to the eligible transaction amount based on the standard value;

displaying, by the processor and on the online billing statement, the number of loyalty points adjacent to the eligible transaction amount;

creating, by the processor and via a micro-application for the social network, a link to request loyalty points from a second user, in response to a request from a first user for the link;

requesting, by the processor and from a first user, details about a transaction,
the details about the transaction including purpose of a transfer of the loyalty points, a recipient, and an intended purchase with the loyalty points;

transferring, by the processor and via the social network, the link and the details to the second user, receiving, by the processor and from the second user, a selection of the link indicating an authorization for a transfer of an additional number of loyalty points to a first loyalty account;

transferring, by the processor, the additional number of loyalty points from a second loyalty account associated with the second user and depositing the additional number of loyalty points into the first loyalty account, in response to the authorization and in response to the loyalty account balance being less than the number of loyalty points corresponding to the eligible transaction amount by the additional number of loyalty points;

receiving, by the processor and in response to the transferring, an indication of a deposit of the additional number of loyalty points into the first loyalty account;

applying, by the processor, the additional number of loyalty points to the eligible transaction amount in the online billing statement;

removing, by the processor, a payment obligation for the selected ROCs; and reducing, by the processor, a total amount owed for the online billing statement by the eligible transaction amount.

\* \* \* \* \*